Oct. 29, 1940.　　　K. G. FRASER　　　2,219,303
PROPELLER
Filed Sept. 15, 1936　　4 Sheets-Sheet 1
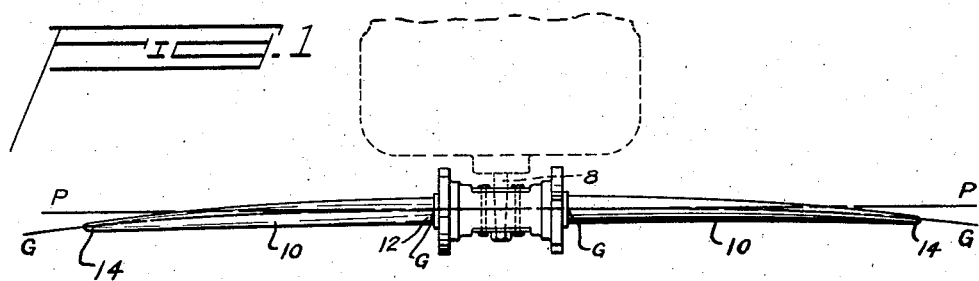
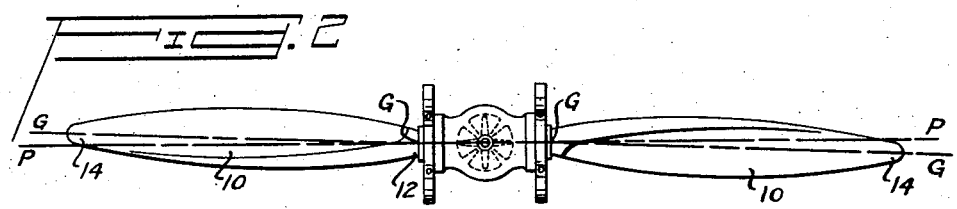
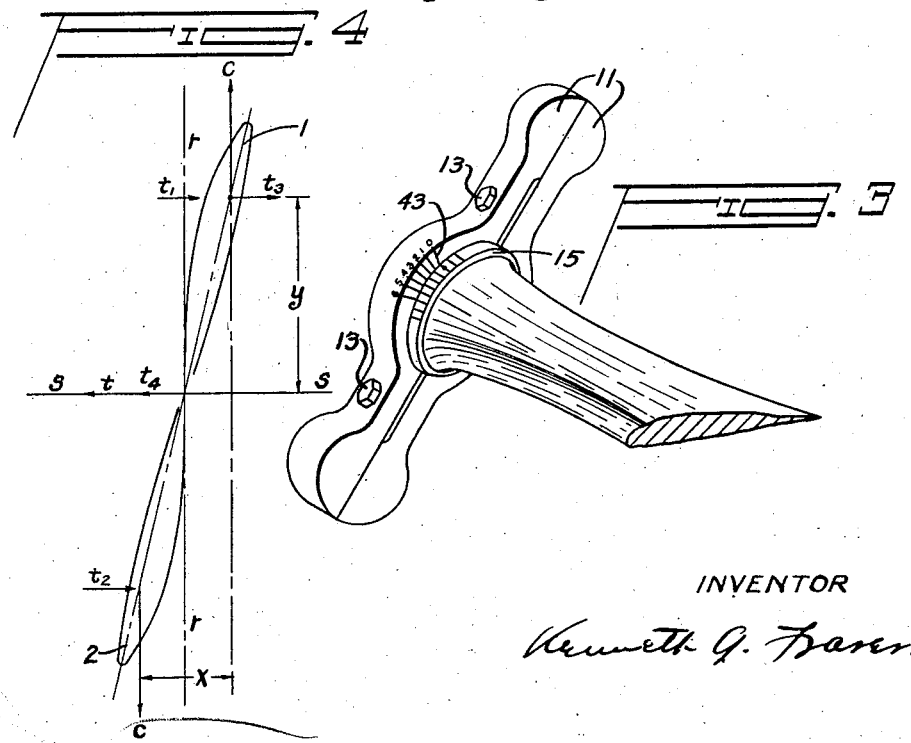
INVENTOR
Kenneth G. Fraser.

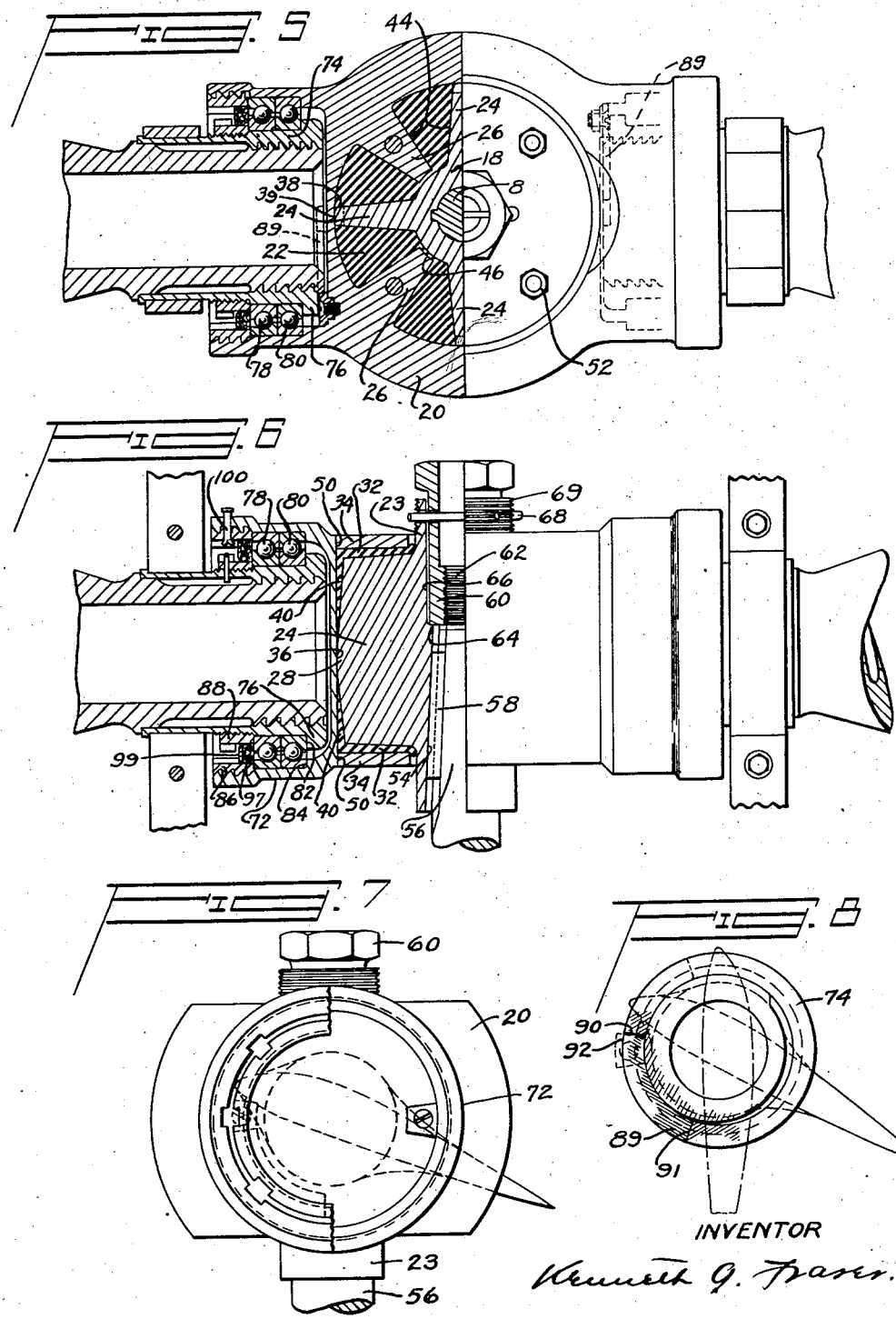

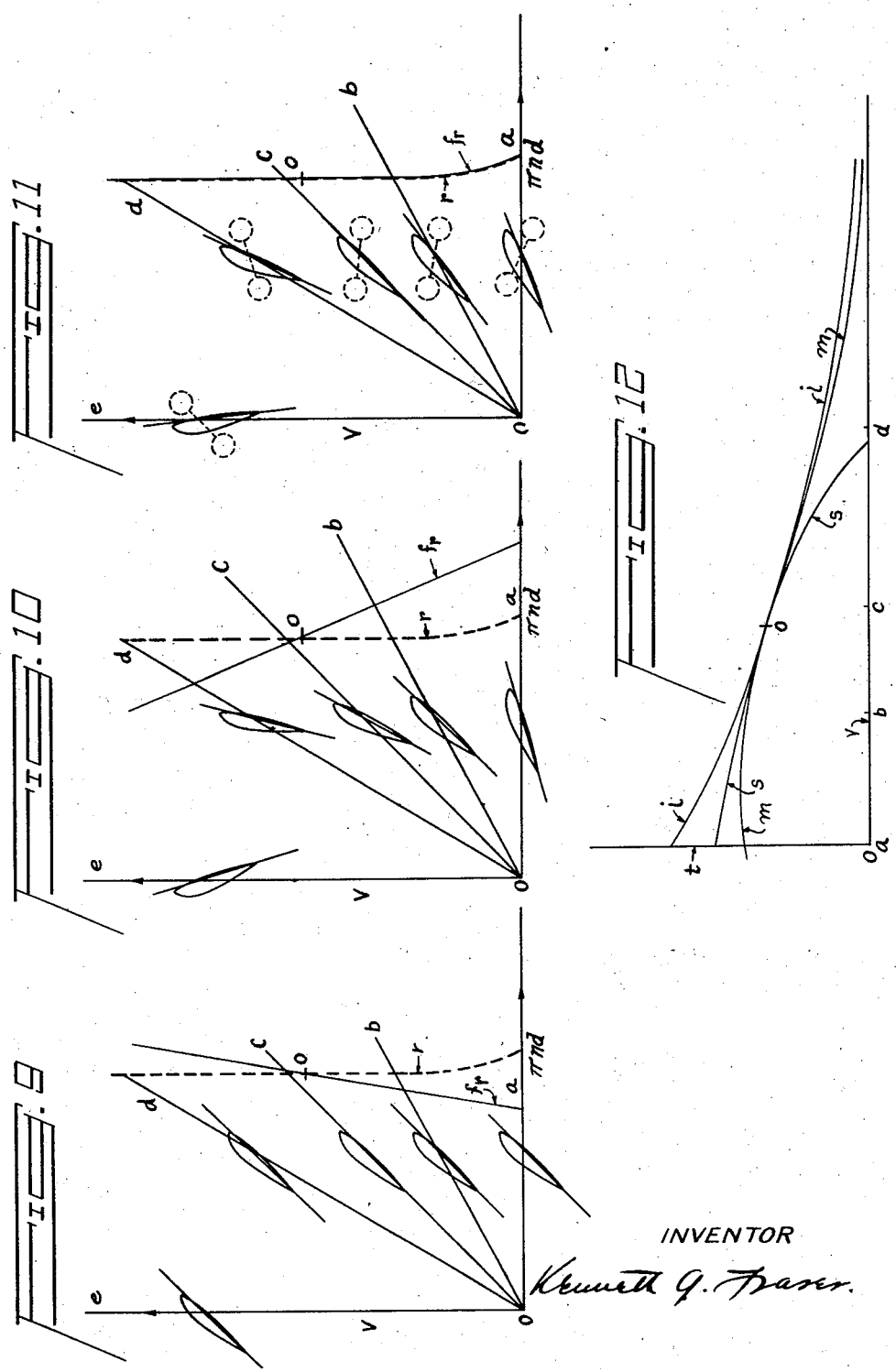

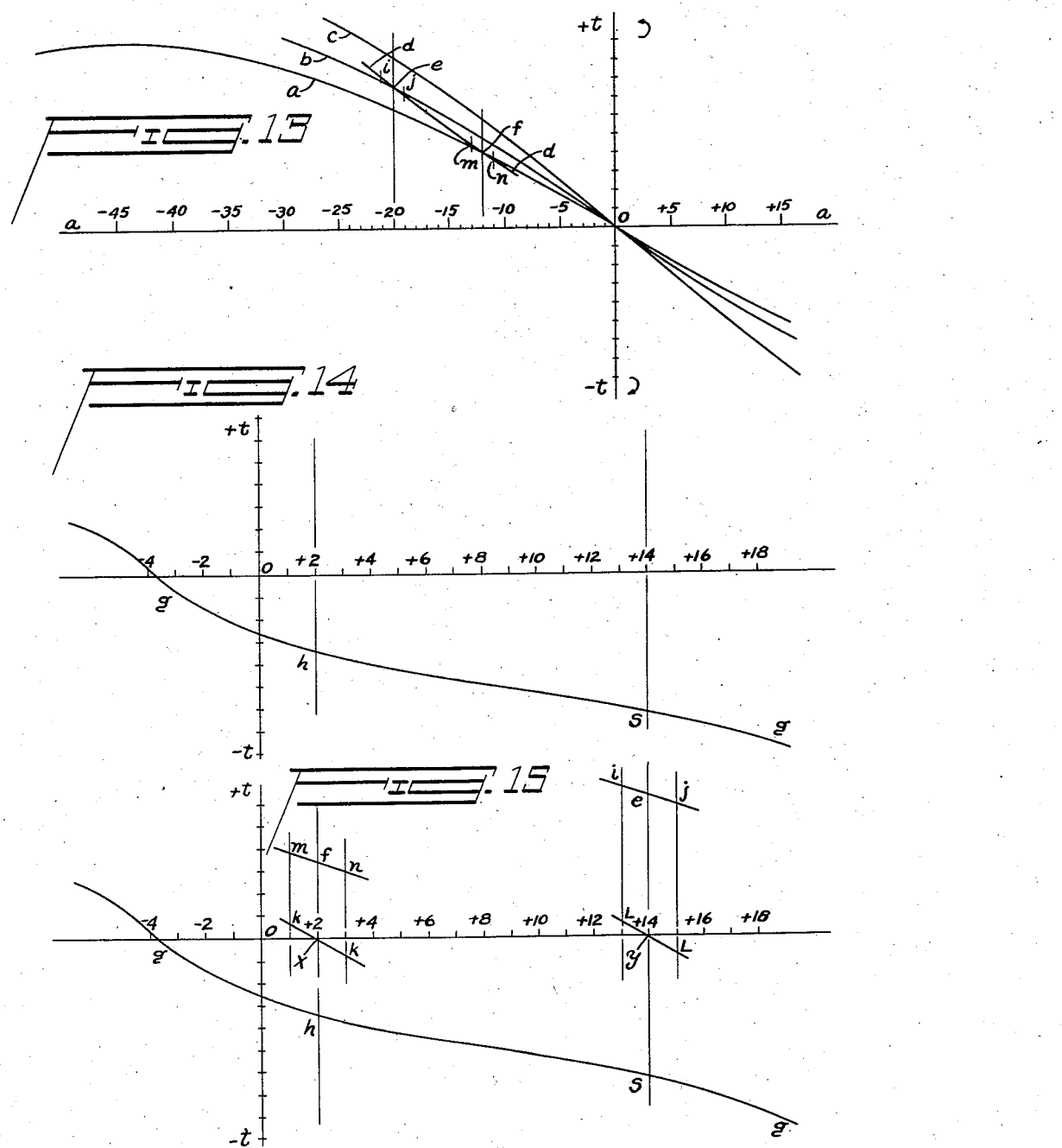

Patented Oct. 29, 1940

2,219,303

UNITED STATES PATENT OFFICE 2,219,303

PROPELLER

Kenneth G. Fraser, Dayton, Ohio, assignor of forty-five one hundredths to Jean Alfred Roche and one-tenth to Max Isaacson, both of Dayton, Ohio Application September 15, 1936, Serial No. 100,828

12 Claims. (Cl. 170—162)

The present invention relates to improvements in propellers and more in particular to propellers for use in connection with aircraft, and is in part a continuation of my application filed December 4, 1935, Serial No. 52,898.

It is well known that for every airfoil section of a blade and ratio of forward to rotational speed, there is one angle of attack (for each element of the blade) which gives the highest efficiency. A fixed pitch blade has its maximum efficiency at only one value of the ratio of forward speed to rotational speed. Controllable pitch propellers of the prior art seek to obtain values of efficiency which, through a wide range of values of the ratio of forward speed to peripheral speed, approach the maximum efficiency that is possible with fixed pitch propellers designed for maximum efficiency at each value of the ratio of these speeds within that range, by changing the blade pitch of controllable pitch propellers either manually or automatically.

It is also known that in order to have the greatest power output from a propeller the pitch and diameter or both must be adjusted so as to permit the engine to turn as fast as possible without exceeding the safe limit of engine speed. Therefore, for a given propeller of approximately correct diameter, the pitch must be varied with respect to forward speed so as to permit a desired rate of engine revolutions.

In common fixed pitch propellers, airfoils and plan forms of blades are selected which will have maximum efficiency when operating under one set of definite conditions. These conditions may be 87 per cent engine power and cruising speed, full engine power and cruising speed or full engine power and speed of best climb, et cetera. Each of these conditions corresponds to a predetermined helix, this predetermined helix having an angle the tangent of which is the ratio of forward speed to the peripheral speed of some reference section taken at a definite distance from the center of the propeller. It is therefore seen that for each condition of flight there is a definite helix angle for which a fixed pitch propeller can be designed to absorb a given power and to have maximum efficiency at that condition, however, when operated at other conditions, the efficiency of the fixed pitch propeller necessarily drops off rapidly. Controllable pitch propellers are resorted to in order to reduce the efficiency loss with respect to the design set of conditions when these inherent design conditions are departed from. The efficiency of current controllable pitch propellers, however, can not be kept at the maximum value partly because the twist of the blade can be correct for only one pre-determined helix, and also because the pitch setting of the blade is controlled by means which are imperfect if they depend upon either the judgment of the pilot or the working of complex mechanisms.

Automatic controllable pitch propellers in general use are further objectionable because of the complexity of interrelated mechanisms which ordinarily comprise engine governor devices to regulate the engine R. P. M., a servomotor to control the pitch of the blades, gearing interconnecting the blades and a supplemental manual control to regulate the pitch of the blade through the servomotor at will. This complexity of devices contributes to the high cost and low safety factor of modern aircraft.

My invention utilizes aerodynamic forces and centrifugal forces to act upon pivoted blades in such a manner as to obtain, automatically, desired values of angle of attack of the blade with respect to its helical path in flight and desired rates of engine rotation to obtain maximum efficiency and maximum power for all operating conditions.

The desired angles of attack are those which will permit the engine to rotate at its maximum permissible speed so that the greatest engine power and consequently the greatest possible thrust may be obtained for all values of airplane speed from the static condition up to and beyond maximum level flight speed.

In order to accomplish these ends, airfoil contours having suitable aerodynamic characteristics will be selected for the blade, the pivot axis of the blade will be suitably located with respect to the airfoil section, the angle of attack of the blade will be given a value most favorable to the condition in which the airplane is desired to have its maximum performance and the mass distribution of the blade material will be adjusted and assisted, if necessary, by the use of counterweights.

Any desired moments and rate of change of moments can be secured in a rotating blade by positioning mass in proper amount and in proper angular relation with respect to the plane of rotation and the pitch axis of the blade.

Likewise by positioning the blade airfoil properly with respect to its pitch axis, a great range of aerodynamic moments and rates of change of such moments can be obtained.

In accordance with my invention the mass moments and aerodynamic moments are selected to balance with stability at pre-determined and highly efficient angles of attack of the blade throughout the operating range of aircraft in such wise as to permit the engine to operate at maximum capacity.

It is possible to provide, by means of proper counterwights, moments capable of balancing the pitch-loss tendency of propeller blades without inducing injurious effects of vibration as a result of engine impulses.

It is similarly possible to utilize the mass counterweight effect to balance the aerodynamic moments of a propeller blade in a pre-determined manner such that the pitch will vary as desired throughout the operating speed range of the airplane and the operating rate of turning of the engine and yet avoid the injurious effects of engine vibration upon the propeller.

I further provide in accordance with my invention, a propeller blade of this character capable of self-adjusting its pitch in flight and so constructed and arranged as to have a minimum of weight for a given power absorbing capacity.

A further disadvantage of controllable pitch propellers of the prior current art is that the range of pitch variation is limited to such an extent that in the event of engine stoppage, the propeller immediately functions as a brake or "windmill" and imposes an objectionable load upon the other already overloaded active engine or engines.

It is therefore a further object of my invention to provide a propeller in which the blades will "feather," that is they will assume a pitch which will offer the least drag against the motion of the airplane in flight, should the engine, for any reason, cease to drive the propeller.

A further object of the invention is to provide a propeller with a cushion, between the driving shaft and hub, which is resilient or shock absorbing in character and positively centering, and which will permit the blades to run out of track when their thrust is unequal and thus establish counter-balancing centrifugal couples neutralizing the wobbling couple which would exist were the blades compelled to rotate in a plane at right angles to the driving shaft axis while their thrusts are unequal. The degree of such resilient motion required is slight because centrifugal forces are extremely large by comparison to thrust forces.

My invention further provides a novel method and means of determining and correcting inequalities of thrust between the blades of a propeller. This is accomplished by making use of the fore and aft angular freedom of the blades about the center of the hub and by observing through the use of tell tale means the extent of out of track of the blades and by correcting the thrust difference by a rotative adjustment of the pitch of the blade or blades or changing the characteristics of the blade or blades until tracking with the desired degree of perfection is obtained.

A further object of my invention is to provide a resilient drive between the driving shaft and propeller which will maintain the center of gravity of the propeller on the driving shaft axis and damp the engine impulses which now prematurely fatigue the shaft, hub bearings or blades.

Other and further objects of my invention will appear in the following descriptions given in connection with the drawings which constitute a part of this specification, and in which:

Figure 1 is a top plan view of a propeller embodying my invention as applied to an airplane;

Figure 2 is an elevational front view of the propeller shown in Figure 1;

Figure 3 is an enlarged view of a propeller blade inner end equipped with a counterweight for adjusting its mass distribution and vernier scales for use in effecting accurate positioning of the counterweight for adjusting its mass distribution and vernier scales for use in effecting accurate positioning of the counterweight with respect to the blade airfoil section;

Figure 4 is a diagram showing the balancing of an unequal thrust moment by a couple resulting from the centrifugal forces acting upon the blades of a propeller in which the thrust is permitted to cause the propeller to rotate out of track;

Figure 5 is a front elevational view of the propeller showing the hub in half section and portions of the blades in section and broken away;

Figure 6 is a bottom plan view of Figure 7 showing the hub and a portion of one blade in half section with the blades broken away;

Figure 7 is an end view looking at Figure 6 from left to right with the near propeller blade removed and the retaining wing broken away;

Figure 8 shows an end view of the inner portion of the blade in two different positions of operation;

Figure 9 is a diagrammatic representation of the functioning of a fixed pitch propeller;

Figure 10 is a diagrammatic representation of one embodiment of my invention;

Figure 11 is a diagrammatic representation of a stable pivoted propeller blade having suitable mass distribution and operating in accordance with another embodiment of my invention;

Figure 12 is a comparative diagram showing the relative thrusts obtainable for the three types of propellers illustrated by Figures 9, 10, and 11;

Figure 13 is a graph showing the relative moments acting upon pivoted and revolving masses such as pivoted propeller blades and appendages thereto;

Figure 14 is a diagram showing the aerodynamic moments of an airfoil such as a propeller blade about a fixed point of reference in relation to angles of attack of said airfoil and;

Figure 15 is a diagram representing in the form of an example, the combination of the diagrams of Figures 13 and 14 and demonstrating the balance and stability of a propeller blade, obtained at desired angles of attack, with respect to the helical angle of the propeller mean section, and hence with respect to the forward speed.

*The blade*

A propeller embodying the principles of my invention is illustrated, herein, and as shown in Figures 1 and 2 comprises two freely pivoted blades that are adapted to be driven from the crankshaft of an aircraft internal combustion engine through a suitable driving connection and preferably through a resilient connection in a manner and for the purposes described more in detail hereinafter.

The blades 10 are of airfoil section substantially throughout their length and taper in plan form from the maximum chord towards the shank portion 12, and towards the tip end 14. The airfoil section of the blade is preferably derived from a suitably efficient airfoil of known aerodynamic characteristics which when mounted will give the desired stability.

The blades may be made from suitable light materials such as forged aluminum or magnesium alloy, each blade being preferably so constructed that the line connecting the centers of gravity of the sections or gravity axis G—G, is substantially straight and gradually off-set in two directions with respect to the axis of pivotation P—P of the blade, the extent of offset in each direction depending upon the amount necessary to reduce bending stresses on the blade to a minimum, and to bring the resultant of the thrust drag and centrifugal loads acting on the blade anchor pivot bearings or hub engaging portion, in the most frequent and continuous flight condition, as near the center of these bearings as possible. The gravity axis is offset forward with respect to the plane of rotation of the pivot axis to substantially eliminate bending moment stresses due to thrust. It is also offset to lag the pivot axis of the blade with respect to the direction of rotation of the propeller, to substantially eliminate the bending moment stresses due to the component of air resistance opposed to the rotation of the blade. These offsets may be compromised if necessary in order to bring into proper relation the airfoil sections and the pivot axis to secure the desired mass and aerodynamic moments from the airfoil section used.

The practical elimination of bending stresses tends to avoid undesirable twisting and whipping of the blade when it is operated at high speeds and under driving impulses. It is also very favorable to the uniform loading and long life of the bearings and also reduces fatigue of the blade material and prolongs its life.

The adjustable mass

A propeller embodying the principles of my invention may also need to comprise masses adjustably attached to the blades, preferably on their shank portions, such as shown by Figure 3. The function of this mass is two-fold: Primarily it serves as an adjustment to the blade mass distribution to provide the desired torque from centrifugal force to cooperate with the aerodynamic moments to control the pitch of the blades as described in detail hereinafter, secondarily it is their function to reduce to the greatest practicable extent the net unbalanced inertia forces which under the action of engine impulses would cause alternating couples tending to oscillate the blade about its pivot axis, thereby varying the pitch and the values of thrust, which would be detrimental to the efficient action and life of the blade. The flattening pitch tendency of the blade can be neutralized or balanced and stabilized by proper distribution of such masses to correct the dynamic balance of the propeller blade. In the event that a propeller blade is so designed that its gravity axis lies in the plane of rotation of its pivot axis, the engine impulses will cause no alternating couples, but as soon as an adjustable mass is added, either ahead of or aft of the said plane of rotation, the alternating couples due to engine impulses referred to above make their appearance. If, however, a propeller blade, as described above, has a gravity axis which leads the plane of rotation, a condition of dynamic unbalance is created which cn be partially or totally remedied by properly locating the additional adjustable masses.

It will be noted from the explanations hereinafter contained that such adjustable masses may optionally be placed either ahead or aft of the plane of rotation, but if there is a condition of dynamic unbalance, such masses should be located on the side cf the plane of rotation where they will act to reduce or eliminate the couples due to engine impulses. If putting all of such adjustable mass on one side of the plane of rotation causes couples to be generated in the opposite direction, it is then evident that such mass should be divided and distributed on both sides of said plane of rotation, in accordance with Figure 3. The determination of the amount of such mass required for balancing the impulse couples may be effected by computing the products of inertia of the propeller blade with respect to its axis of rotation and to the axis of the driving shaft. For example, if a blade weighing twenty pounds has its center of gravity thirty inches from the center of the propeller and this center of gravity is one inch ahead of the plane of rotation, the product of inertia will roughly be 20 x 30 x 1 equals 600 inch/lbs. Now if an adjustable mass of five pounds is to be used for the purpose of counteracting the blades pitch decreasing tendency or its aerodynamic moments, or both, such mass being located at a radius of ten inches from that of the driving shaft and six inches from the pivot axes of the blade, it is seen that it will contribute a product of inertia of 5 x 10 x 6 equals 300 inch/lbs. and that such a mass located on the same side of the plane of rotation as the blade would greatly aggravate the inertia couples resulting from engine impulses, whereas if located on the other side of the plane of rotation, it would reduce by 50 per cent the magnitude of such alternating couples. The masses as shown in Figure 3 are each constructed in two sections 11 that are clamped together around the sleeve by bolts 13 and are restrained against centrifugal forces acting in the direction of the pivot axes of the blades by shoulders 15.

The hub

As already noted and in accordance with my invention, the blades are resiliently drivingly connected to the shaft 8 by means of a hub 16, see Figures 5 and 6. This hub is composed of three essential components, a metal driving spider 18, a metal casing 20, and a resilient connection 22 therebetween.

The driving spider as illustrated is formed with a cylindrical hub portion 23 and four vanes 24, ninety degrees apart. Each vane preferably tapers in thickness at the tip or outer end 28. These vanes also taper in length from the hub portion to their tip ends to provide a clearance 32 sufficient to avoid metal to metal contact with the closures 34 of the hub casing. The tip ends of the vanes are made arcuate with the high points 36 lying substantially in the plane of rotation of the pivot axis of the blades and on the surface of a sphere, having a diameter substantially equal to that of the adjacent cylindrical surfaces 38, 39 of the hub casing and driving spider when assembled together with the resilient means. The vane tip outline is so shaped as to provide sufficient clearances 40 to permit the desired degree of tilting or oscillation of the hub casing in planes passing through the axis of rotation of the propeller and normal to the plane of rotation thereof.

A suitable connection between the shaft and the driving spider may be provided for drivably connecting the hub to the shaft and, as illustrated, the hub portion of said spider is formed with a tapering bore 54 that encircles the tapered end 56 of the driving shaft and is keyed thereto by a key 58. The contact surfaces of the shaft and spider are forced into intimate frictional engagement by means of an internally threaded sleeve 60 that is threadably received on the threaded end 62 of the shaft and is in abutting relation with a shoulder 64 formed by a circular bore 66 in the hub portion of the spider. This sleeve is positively locked to the spider by means of a cotter pin 68. The spider is provided with a threaded forward end 69 for the attachment of a pulling tool (not shown) to remove the hub from the driving shaft.

The hub casing is preferably formed from light materials, such as aluminum alloy, and is formed with four inwardly radially projecting vanes 26 spaced ninety degrees apart which, when the hub casing receives and surrounds the driving spider in driving relation, are arranged in staggered and spaced relation with the vanes 24 of the spider to provide spaces or chambers 44 for the resilient means.

The casing vanes terminate at their inner ends 46 in a substantially cylindrical surface and are slightly shorter in radial extent than the spider vanes, so as to avoid contact with the hub portion of the driving spider throughout the desired angle of relative tilt between the hub-casing and driving spider. The casing vanes are, however, longer longitudinally than the spider vanes, and extend sufficiently forwardly and rearwardly thereof so as to provide the spaces 32 between the leading and trailing edges of the spider vanes and casing closures 34 that fit closely within cylindrical recesses 50 formed on opposite sides of the hub casing and fixedly connected to the said casing by means of bolts and nuts 52 passing through the casing vanes and casing closing plates.

The hub casing is suitably constructed for rotatably supporting the root ends of the blades in radial sockets 72. The blades are capable of rotation about an axis normal to the axis of rotation of the driving shaft for varying the blade angle or pitch and as illustrated, are provided with a steel sleeve 74, threadably fixedly connected thereto and formed with an outwardly projecting annular shoulder 76 at their inner ends serving as bearing abutments.

Process of hub assembly

Rubber of suitable resiliency fills the spaces or chambers between the driving spider, the hub casing and the closure plates, and is preferably held therein under compression. The resilient rubber may be cured or vulcanized in place in this way establishing a bond by vulcanization between the rubber and the several parts wherever it contacts the same. In carrying out the step of curing or vulcanizing the driving spider and hub casing are assembled with the uncured rubber stock inserted in place in the spaces between the opposing vanes. The driving spider is held in proper position with respect to the hub casing during vulcanization by means of end fittings (not shown) which fit closely within the recesses 50 normally occupied by the casing closures to confine the rubber during curing, or vulcanization, each fitting having four dowel pins that fit closely within the openings in the vanes. In assembling the parts, one of the fittings is first mounted at one end of the hub portion with the dowel pins in a position corresponding to desired position of vanes 26; thereafter the assembled driving spider and processing closure plate (not shown) are inserted in the hub casing and the other end closure (not shown) is then fitted and connected in place.

The entire assembly is now placed in a live steam vlucanizing press.

It will be understood that the rubber need not be vulcanized in place and that strips or blocks of rubber already cured may be forcibly inserted in spaces between the driving and the driven vanes, it being desirable that the volume of rubber in each space be approximately equal to the volume of each space and the contour of the blocks may be the same or slightly different from the parts defining such spaces. These rubber blocks are installed by placing the first four in alternate spaces with the spider and casing assembled loosely then anchoring either the spider or the casing and turning the other to compress the already inserted rubber blocks, thus providing ample space for the insertion of the remaining four blocks. As noted the length of the blocks are sufficiently greater than the length of the casing vanes to provide the desired initial compression of the rubber. Contact between the spider vanes and the casing closures may be prevented without loss of the desired tilting action by the use of separate or connected segments of sheet rubber of suitable thickness, disposed between the ends of the spider vanes and the inward faces of the hub closures. It will thus be seen that with this resilient drive the impulses from the engine to the propeller will be cushioned and since the resilient means will yield to unequal thrust moments of the blade, such moments will be counteracted by centrifugal moments as shown by Figure 4 and as explained heretofore, therefore, these alternating moments will not reach the drive shaft and therefore will not be transmitted to the airplane structure supporting the engine.

It will be seen that the positive centering of the driving spider in the hub casing will prevent the relative displacement of the center of gravity of the propeller with respect to the axis of the driving shaft and consequent vibration.

It will also be understood that the hardness of the rubber used in this hub must be selected to give the smoothest torque possible to the propeller and to avoid resonant oscillations between the engine crankshaft and the propeller. The resilient drive damps the impulses of the non-constant torque engine and thereby materially reduces the magnitude of the alternating couples acting on the blade above their pivot axis.

Balance of unequal thrust

Referring to Figure 4 the neutralization of the couple caused by unequal thrust of the propeller blades is explained thus:

Axis S—S represents the axis of the propeller driving shaft, $t_1$ and $t_2$ represent the equal portion of air thrusts on blades 1 and 2 respectively, which is balanced by the force $t$ from the shaft to the hub, $t_3$ represents the excess of thrust of the air on blade 1 which is transmitted to the hub through the blade and balanced by force $t_4$ acting from the driving shaft on the propeller. Forces $t_3$ and $t_4$ cause a couple of magnitude $t_3 y$ which acts clockwise, this couple causes the angular displacement of the propeller from the plane of rotation $r$—$r$. The equal centrifugal forces acting on the blades are represented by $c$. These forces cause a couple of magnitude $cx$ which acts counterclockwise and is therefore opposite to the thrust couple $t_3 y$. Since for small displacements of the blades from the plane of rotation, the hub connection offers practically no resistance to such displacements, it follows from the well known laws of mechanics that the displacement is just sufficient to satisfy the condition of equilibrium represented by the equation: $t_3y=cx$, and the angle of displacement or tilt will be $$\tan^{-1}\frac{x}{2y}$$

this angle will be very small for all cases of minor thrust inequality because the value of $c$ will be several hundred times that of $t_3$.

Although my propeller will run smoothly regardless of inequalities of thrust between the several blades because of the fact that provision is made for balancing unequal thrust moments of the blades by means of balanced centrifugal forces, nevertheless, should it be desired to obtain a true tracking of the blades, any inequality of thrust may be eliminated by utilizing means for differentiating between the blades while they are rotating at high speed on the ground or in flight and determining and correcting for the existent extent of inequality of thrust of said blades. Any suitable tell tale means may be employed as for example, any or all of the blades can be provided with identifying markings, such as different color marks that are readily observable and from which the particular blade or blades having the greater thrust can be distinguished. Knowing which blade or blades presents the greater thrust, correction may be accomplished by varying the pitch of the blade. As illustrated in connection with a pivoted blade, the auxiliary mass is angularly adjusted relative to a blade with great accuracy, by means of a vernier scale as shown in Figure 3.

Pivoted blade attachment

A blade pivoted in a hub for control of its pitch requires bearings capable not only of carrying the radial centrifugal force of the blade, but also another set of forces which result from the angular acceleration of the blade by the motor, and still a third set of forces which result from the fly-wheel effect of the blade when it restores energy to the motor through the hub. In order to minimize friction which would be very great with ordinary plain bearings, ball bearings 78 and 80 are provided for each blade. They are interposed between the abutment 82 of threaded retaining sleeve 74, and shoulder 84 formed in the socket and between outer retaining nut 86, and inner retaining nut 88, which serve to properly attach the blades in the sockets.

The blade end sleeve 74, shown in Figure 5, is formed with a segmented recess 89, the end shoulder 90 of which will contact one side of the stop 92, best seen on Figure 8, when the blade is at the desired pitch angle for the static condition. In the "feathering" position, the end shoulder 91 of the recess will contact the opposite side of said stop. A similar stop 92 is similarly disposed in the other blade socket. These stops are anchored to the socket bottoms by means of screws 96.

When the engine is being started the centrifugal force of the blade can be considered as small and neglected. The most important function of the blade mounting is then to convey acceleration from the motor shaft through the hub to the blade. The blade, tending to lag, tends to cant in the hub and bearings are so disposed as to resist the tendency to cant with minimum loads. During the phase when the blade is restoring energy to the motor, a similar action takes place but the blade's tendency to cant in the hub is in the opposite direction. In fact, the driving of the propeller mounted on an explosion type of engine can be considered as a succession of pulsations, during one phase of which the engine drives the blades and during the other phase of which the blades drive the engine. This pulsation affects the inter-connecting parts between hub and blade, which must be designed to carry the alternating forces of these impulses without play, without shock and without exceeding permissible stresses in the elements involved. When the engine is running normally, that is to say, at a rate usually common in flight, the centrifugal force becomes the predominant force acting upon the connection of the blade to the hub, because the intensity of the centrifugal force becomes several times the intensity of the impulse and lag forces. The latter forces then cause positive and negative increments to the centrifugal force without reversing its direction of action, so that any bearing element, such as the outer ball bearing 20 in the construction illustrated, provided solely to oppose torsional impulses at slow speeds during the period of acceleration are relieved of load when the propeller turns at the rapid rate.

Felt sealing material 97 is provided for retaining the bearings lubricant and to exclude foreign matter therefrom. This felt is held in place by means of a washer 99, which in turn is held in place against the action of centrifugal force by the wrench connecting lugs of the outer bearing retaining ring 86. The retaining rings are respectively locked against removal by cotter pins 100.

Comparison of propeller types

In designing aircraft propellers of any type the limitations and requirements of both the engine and airplane must be taken into consideration. In order to derive all of the power available from the engine, the latter must be permitted to turn at the highest permissible rate for all conditions of flight. The permissible rate for operation over extended periods of time is constant so that; while the airplane is climbing, or traveling at its maximum speed, with full throttle, there is a definite rate of turning which is permitted, but must not be exceeded, in fact, the governing body responsible for airworthiness of aircraft establishes such limitations by regulation. Aircraft engines are however, permitted to exceed the rate of turning referred to above for short intervals of time during the take-off and initial climb, in order to increase the altitude obtainable in a given takeoff distance. This practice increases the safety of flying, providing this higher rate of turning is not maintained for a sufficient time to cause overheating of the engine.

In Figures 9, 10, and 11, the functioning of three different types of propeller is represented on graphs constructed on two scales at right angles, the vertical scale denoted by V represents forward speed of the propeller as determined by the relative air velocity of the propelled aircraft out of the slipstream, and the horizontal scale designated $\pi nd$ represents the peripheral speed of the blade mean section. On these three figures curves designated $r$ represent the desired rate of turning of the engine at full throttle throughout the entire range of forward speed, and it is to be noted that these lines shows a constant rate of turning excepting for the slow values of forward speed where an increment of the rate of turning is permissible, and hence a corresponding increment of peripheral speed of the mean blade element is shown.

The airplane requires, for best performance, that at all forward speeds, the propeller deliver the maximum possible thrust. The airplane will further be benefited if upon stoppage of the engine the propeller "feathers" into a position of minimum resistance to forward speed.

In the following explanation use will be made of three terms which must be clearly understood:

The first of these is the "angle of attack" of the propeller blade. This angle of attack is the angle at which the mean section of the propeller blade meets the air through which it passes.

The second is the "helical angle" which is the angle of the helical path followed by the same representative or mean section of the propeller blade with respect to the plane normal to the axis of the helix which coincides with the axis of rotation of propeller. This angle is a function of the rate of turning of the engine and the forward speed. It can be determined for any particular case by the formula $$\alpha_h = \tan^{-1}\left(\frac{v}{\pi n d}\right)$$

where $v$ represents the forward speed in feet per second, $n$ is the rate of turning of the engine in revolutions per second, $d$ is the diameter in feet of the helix described by the mean blade element and $\pi$ is the constant 3.1416. The helical angle becomes zero when the propeller is operated on a stationary airplane in the condition known as "static", 90 degrees when the propeller is stationary and the airplane moving, as in the "feathering" condition. The symbol $$\frac{V}{\pi n d}$$

is usually written as $$\frac{V}{nd}$$

and it is so used in this specification, where it has the meaning above defined, that is, in substance, the relation between forward speed and rotational speed in terms of helical path angles.

The third term is "pitch," which is the angle made by the chord of the representative blade element with the plane or rotation of the propeller. It is equal to the sum of the helical angle and the angle of attack.

Referring to Figure 9 where the functioning of a fixed pitch propeller is represented, the mean blade section is shown with a constant pitch angle. Comparison of this angle with the helical angles denoted by the lines $a$, $b$, $c$, $d$, and $e$, shows the variation of the angle of attack in this type of propeller with respect to forward speed. Note that in the static condition, the angle of attack is positive and of considerable magnitude, while as the forward speed increases progressively, giving the helical angle lines $b$, $c$, and $d$, the angle of attack gradually diminishes and becomes definitely negative at $d$. Finally at $e$ representing the condition of an airplane traveling with a stationary engine the propeller is at a strong negative angle of attack which causes a large air drag. The effect of these variations of angle of attack upon the rate of turning of the engine will now be discussed.

Since the airplane is called upon to operate predominantly at a certain speed of flight, fixed pitch propellers are designed to operate most efficiently at this condition at the sacrifice of some efficiency for all other conditions. In Figure 9 the design condition is represented by the letter $o$. The line $f_r$ represents all values of $\pi n d$ with respect to forward speeds for full throttle setting of the engine. These values of $\pi n d$ are proportional to the rate of turning of the propeller since the diameter is constant and $\pi$ equals 3.1416. It is well known that, in the static condition and at low values of forward speed the angle of attack of fixed pitch propellers is too great to permit engines to turn at their allowable speed, whereas for speeds greater than that corresponding to the design condition the angle of attack is too low to absorb the entire power of the engine without exceeding the allowable rate of turning, as shown by this diagram. Therefore, with fixed pitch propellers the full power capacity of the engine is efficiently utilizable only at one value of forward speed, and consequently the thrust obtained from this type of propeller is not as great as it could be at all other values of forward speed.

Referring to Figure 10 which represents diagrammatically the functioning of a propeller in accordance with a simpler form of my invention, the blade of which consists of a stably pivoted airfoil, with masses so distributed as to give no resultant centrifugal moments. Aerodynamic forces alone control the angle of attack of the blade, and since the blade is stable it will maintain a definite value of angle of attack for all forward speeds. The blade will vary its pitch so as to maintain a constant angle of attack, whatever be the helical angle of the mean blade element. If such a propeller is designed to absorb efficiently the power of an engine at the same set of operating conditions as designated by the letter $o$ in this figure and as used also in Fig. 9, this propeller will offer too low a resistance to turning in the static and low forward speed conditions and will permit the engine to exceed the permissible turning rate, as shown by line $f_r$ of Fig. 10. Such a propeller will therefore require throttling of the engine at the lower forward speeds resulting in a lower thrust being available for acceleration and take-off than in the case of the fixed pitch propeller. For values of forward speed greater than that corresponding to the design condition, the angles of attack will be too great and will prevent the engine from reaching the maximum permissible rate of turning and consequently full horsepower will not be available and a maximum thrust will not be obtained. In flight, however, this propeller will never reach a condition of negative angle of attack and will continue to deliver thrust for very high values of forward speed. The excess speed tendency of this type of propeller at low values of forward speed can be pre-determinately checked to any desired extent by the suitable disposition of the stops 92 shown in Figs. 5 to 8, so that the pitch can not be reduced below a pre-determined value by the aerodynamic moments. The same stop may cooperate with a recess at the root end of the blade such as 89 of Fig. 8 to limit the pitch angle to any desired value of "feathering" position to prevent the propeller from turning the engine backwards and to reduce head resistance to a minimum.

Referring to Fig. 11 where the functioning of a propeller in accordance with another variation of my invention, is diagrammatically represented, a condition of operation is shown in which the propeller mean element assumes angles of attack which permit the engine to turn at full permissible rate throughout the range of forward speed, as shown by line $f_r$ of Fig. 11. This condition is obtained, as will be explained later in detail, by combining the moments of a substantially stable pivoted blade having aerodynamic characteristics, similar to those represented in Fig. 10 with the centrifugal moments of properly distributed masses of the blade about its pivot axis and those of auxiliary masses attached thereto, if necessary. These masses being of such magnitude and so arranged as to produce moments which increase the angle of attack in the static low forward speed range of operation and force or allow it to decrease for the higher values of forward speed. These mass moments produced by centrifugal force will disappear when the engine ceases to turn and the pivoted blade will "feather." The feathering position may be perfected by the use of a suitable stop as previously described which will limit the "feathering" at the angle at which the airfoil has the least resistance to forward speed. Auxiliary means of well known construction, such as a propeller brake (not shown) may also be provided for preventing any rotation or windmill effect possible. Another stop may also be used to serve to limit the static angle of attack to any desired value.

Figure 12 shows a diagram in which the relative thrust characteristics of the three types of propellers described in Figures 9, 10, and 11 are shown. In this diagram the vertical scale "$t$" represents the thrust obtainable with respect to forward speed shown on the horizontal scale $v$. The letter $o$ represents the design condition common to all three propellers. Curve $s$ represents the trust obtained with a propeller of the fixed pitch type. Curve $m$ represents the thrust obtainable with a propeller having a stably pivoted blade with such mass distribution that couples due to centrifugal moments are zero or nearly so, maintaining constant angle of attack with respect to the relative airflow. Curve $i$ represents the relative thrust of a propeller, the angle of attack of the blade of which is controlled by centrifugal moments in equilibrium with aerodynamic moments. It is evident that this type of propeller, permitting maximum power of the engine at all values of forward speed and having its blade elements maintained at efficient angles throughout the range of forward speed must deliver the greatest thrust under all conditions consistent with engine limitations.

*Operation of dynamic forces on propeller blades*

It is well known in the propeller art that masses rotating about an axis seek to place themselves as far from that axis as they are permitted by their connections therewith. This is a result of the action of centrifugal forces upon these masses in a radial direction. It follows that parts which are pivoted about a pivot axis at right angles to and intersecting the axis of rotation will generate torsional moments about such pivot axis. These moments are proportional to the square of the normal distance between the part and the pivot axis and a function of the angle of displacement of the normal line connecting the center of the mass of the part and the axis of pivotation from the plane of rotation. This angular function is the product of the sine and the cosine of the angle made by the said normal line with the plane of rotation. It is to be noted that this function repeats itself twice in 360 degress which indicates that there are two positions for any part which will give identical centrifugal moments about the pivot axis, one being ahead of the plane of rotation, the other aft, and diametrically opposite. The determination of the torsional moments of a propeller blade about its axis of pivotation is usually preformed by dividing the blade into suitably small elements and by integrating the torsional effects. The mathematical expression for this integration of torsional moment is $T = \Sigma dm w^2 r^2 \cos \alpha \sin \alpha$, where $T$ represents the torsional moment of the blade in foot pounds units, $dm$ represents a small mass element of the blade in mass units, $r$ represents the normal distance of the small element $dm$ from the axis of pivotation $w$ represents the angular velocity of rotation of the blade about the axis of rotation of the propeller, $\alpha$ represents the angle made by the said normal distance with the plane of rotation, and the symbole "$\Sigma$" implies that the sum of the effects of all the elements of the blade are added together. This integration is repeated with the blade in several positions with respect to the plane of rotation to determine the maximum value which indicates the angular position of the blade's "equivalent counterweight" with respect to the mean blade element. It is then easy to determine the radius of action of this equivalent counterweight. The properties of this equivalent counterweight will be modified as desired when the need arises by the addition of suitable masses at suitable distances and orientations, attached preferably to the shank of the blade as near the center of rotation of the propeller as possible. Such auxiliary masses are preferably adjustably connected to the propeller blade to permit adjustment of angles of attack of the blades.

*Operation of dynamic and aerodynamic forces on propeller blades*

The balance and stability of the propeller I have invented is demonstrated in principle and the method of its design is exemplified by means of the following description and Figures 13, 14, and 15.

Figure 13 shows diagrammatically the twisting moments resulting from rotating pivoted masses out of the plane of rotation of the pivot axis or equivalent counterweights, with respect to the angle of their acting radius, or major axis, with the plane of rotation, the twisting moment scale "$t$—$t$" being vertical and the angle scale "$a$—$a$" horizontal. The convention of signs chosen is up and positive for counterclockwise moments for the vertical scale and to the right and positive for counterclockwise angles starting with horizontal corresponding to zero for the horizontal scale. The zero value for the horizontal scale represents the case where the equivalent counterweight is in the plane of rotation of the propeller. Curves $a$, $b$, and $c$ represent the moments of three counterweights of different strength to choose from. The difference in strength corresponding to changes of mass, length of radius, angular velocity, or any combinations thereof. Displacement of 45 degrees counterclockwise and 15 degrees clockwise from horizontal are represented as sufficient to the explanation which follows:

Curves $a$ and $b$ may be considered to represent the twisting moments of a given "equivalent counterweight" for two different speeds of rotation and curve $d$ which connects point $e$ of curve $b$ with point $f$ of curve $a$ is intended to represent the twisting moments of the given equivalent counterweight subjected to rates of rotation which vary gradually from the value for which curve $b$ is drawn to a lower value for which curve a is drawn, while the angular displacement of the equivalent counterweight radius is changed from —20 degrees to —12 degrees. The change of rate of rotation corresponds to the change of rate which is desired in a propeller between the static and the high forward speed condition while the change of angular displacement corresponds to the change of desired blade pitch. If one desired to merely consider a propeller designed for a constant rate of rotation throughout the range of operation, a single curve such as b would suffice and curve d would be unnecessary.

Figure 14 shows the aerodynamic twisting moments of a stably pivoted propeller blade represented by curve g—g. The vertical scale of moments is identical to that used in Figure 13. The horizontal scale is sufficient to show all the values of angle of attack used by a propeller blade in all its operating conditions. It may be noted that the moments so represented give balance for the negative value of angle of attack in the neighborhood of —4 degrees while in the range of positive angles of attack the aerodynamic moments are nose heavy, indicating the tendency of the airfoil to reduce its angle of attack to the value of equilibrium just mentioned that is, the angle of attack at which feathering will occur when the driving power is cut off. On curve g—g are denoted the particular points h and s corresponding to the angles of attack of 2 and 14 degrees which represent the angles at which the mean or reference element of the blade is desired to function at high speed, and in the static condition respectively. These angles of attack having previously been determined by the usual propeller design methods as being those which will absorb the power of the engine at the desired rate of turning with the chosen propeller diameter.

Figure 15 shows the combination of aerodynamic and centrifugal moments which balance and stabilize the propeller blade at the desired pitch throughout the range of forward speed and at the desired rates of rotation; in this figure the scales, sign conventions and curve g—g are the same as in Figure 14, but there has been added above points h and s two short segments of curves, the upper two i—j and m—n which represent "equivalent counterweight" moments transferred directly from curve d of Figure 13 and covering a range of 2 degrees pitch change about points s and h respectively. Curve segments k—k and l—l represent the combined counterweight and aerodynamic moments obtained by geometrical adidtion of segments i—j and m—n to curve g—g.

Assume now that a propeller with pivoted blades in accordance with my invention has a mean blade element at 42" radius and equivalent counterweight and aerodynamic moments as represented on Figures 13 and 14. Assume further that it is desired to operate this propeller in a static condition at a speed of rotation of 2200 turns per minute and at an angle of attack for the mean element of 14 degrees and that the same propeller is desired to turn at a rate of 2000 turns per minute, at an angle of attack of 2 degrees when the forward speed is 300 feet per second and the helical angle is 20 degrees. In the static condition in which the helical angle is zero degrees the pitch must be 14 degrees and at the 300 feet per second forward speed condition where the helical angle is 20 degrees, the pitch must be 22 degrees.

Curves a and b have already been chosen with the proper ratio of ordinates to represent twisting moments of a given equivalent counterweight at 2000 and 2200 turns per minute respectively. Since the ratio of the squares of blades' rates of turning is .84 the ordinates of curve a bears that ratio to the ordinates of curve b. The slopes of a and b have further been so chosen that their heights e and f occur on an angular displacement of 8 degrees equal to the pitch change desired. Points e and f of Figure 13 are transferred to Figure 15 above the static and high speed angles of attack respectively, it is then seen that the moments are in balance at both conditions. i. e.: moment f=moment h and moment e=moment s. Stability at the two conditions is demonstrated as follows: Consider point n of Figure 15, assume that some external cause reduces the angle of attack of the blade momentarily by one degree to the value of one degree. With the airfoil nose towards the right as agreed in the convention of signs this is a clockwise rotation, which will increase the departure of the equivalent counterweight from —12 degrees to —13 degrees and therefore cause the moment represented by point f to grow to the value represented by point m. Assume now a disturbance in the opposite direction of the same magnitude and the same process, shows that the moment represented by point f will drop to the value corresponding to 11 degrees on Figure 13 and to point n of Figure 15. Combining now the curve m, f, n with the segment of the aerodynamic moment curve immediately below a segment k—k is obtained and this segment has a slope indicating strong stability. A similar process of combination, preformed at the point representing the static condition, yields the curve segment l—l which also indicates strong positive stability. In like manner it can be shown that for any angle of attack between 2 and 14 degrees, the propeller blade is stable, if the speed of the airplane and the throttle setting are stabilized.

When the required values of "equivalent counterweight" and its setting have been determined that value must be practically imparted to the blade by any of the means mentioned previously such as the use of adjustable additional masses, or changes in the cant of the gravity axis or changes in the mass distribution of the blade per se.

The curve g—g of aerodynamic moments may intersect the angle scale at any point other than —4 degrees and may have any other slope. Correspondingly, the points e and f may shift into the positive values of angular rotation to the plane of rotation in Fig. 13 and the propeller will function satisfactorily provided the combined effects of aerodynamic and centrifugal force moments give stability.

The operation of the propeller will be understood from the foregoing description but the more important features thereof may be briefly stated as follows: Each blade is mounted in the hub for free and independent movement about a longitudinal axis, there being no connection between the blades other than the hub. Each blade is so shaped and arranged that the airfoil portion thereof is truly stable about its axis of pivotation throughout a wide range of pitch angles. For this purpose the blade is so formed that the centers of gravity of the several blade sections, that is the gravity axis, lie in a substantially straight line, which at the shank portion of the blade is substantially coincident with the axis of pivotation but at the tip of the blade lags with relation to, or is in the rear of, the axis of pivotation. The axis of pivotation is so arranged that the major part of the airfoil portion of the blade lies to the rear of that axis. The aerodynamic forces acting on the blade, when the airplane is in motion, tend to rotate the blade toward its high pitch position and centrifugal force acting on the blade tends to hold the same at a predetermined pitch. In the arrangement illustrated the dynamic forces on the blade balance the aerodynamic forces and the blade has no tendency to change pitch while in operation at a given R. P. M. and forward speed. When the propeller rotates and the airplane is at rest there is a set of aerodynamic forces acting on the blade which tend to decrease pitch, but when the airplane begins to move forward a change in aerodynamic forces arises which tend to move the blade toward its high pitch position and which increase with the square of the speed of forward movement. The centrifugal forces acting on the blade through the masses of the blade and the auxiliary counterweights oppose the adidtional aerodynamic forces and tend to maintain the blade at its mean operating pitch. The two forces, that is, the air force imposed on the blade by forward movement and the centrifugal force imposed thereon by the auxiliary mass, cooperate to move the blade from its mean position and impart thereto that pitch which will most nearly utilize the full power of the engine under each operating condition. Thus when rotational speed is high with relation to forward speed, and the value of $$\frac{V}{nd}$$

is small, as during the takeoff or climb, the pitch decreasing air forces will predominate and the blade will have a relatively low pitch, substantially as shown at $a$ in Fig. 11. As the forward speed increases (increasing the value of $$\frac{V}{nd})$$

the pitch enhancing air force acting on the blade increases and the blade pitch therefore increases, maintaining the load and the speed of the engine substantially constant, as shown at $c$ in Fig. 11. When the maximum driven forward speed is attained, $d$ in Fig. 11, the further increase in forward speed with relation to rotational speed (giving a still higher value of $$\frac{V}{nd})$$

will cause the blade to assume a still higher pitch. Should a speed greater than the maximum driven speed be attained, as in a power dive, the forward speed will greatly exceed the rotational speed and the blade pitch will be further increased, thus maintaining propeller control and preventing the "windmilling" action of the propeller. It will thus be apparent that under all operating conditions the pitch of the blade or blades will be automatically controlled and established at the most efficient pitch angle by aerodynamic and centrifugal forces opposed one to the other and cooperating, the magnitudes and senses of said opposed forces depending, respectively, on the forward speed and the rotational speed of the propeller. The auxiliary or compensating mass is here shown as adjustable and in some cases adjustability is desirable but in many instances the desired mass relation may be attained by modifying the weight of an auxiliary or compensating mass the position of which is not adjustable with respect to the remainder of the blade structure. It is apparent, however, that regardless of whether the compensating mass is adjustably or non-adjustably fixed to the remainder of the blade structure, it has a fixed operating position relative to the remainder of such structure, not moving relative thereto during operation of the propeller. Further, this mass may be an integral part of the blade instead of being attached thereto and may take various forms. It will also be understood that while the invention has been illustrated and described as embodied in an aircraft propeller it is equally applicable to propellers of various kinds.

It will be understood that I do not intend to limit my invention to the devices and the applications thereof as illustrated herein as various changes may be made by those skilled in the art without departing from the spirit of my invention.

What I claim and desire to secure by Letters Patent is:

1. In a propeller, a hub, a plurality of blades separately mounted on said hub for pivotal movement about radial axes substantially in the plane of rotation of said hub free from restraint other than the restraint inherent in the blades themselves, the area of each blade being so positioned with respect to its pivotal axis that when the forward speed of the craft which carries the propeller is increased relative to rotational speed of the propeller the aerodynamic forces on the blade turn it to increase pitch and when forward speed of the craft is decreased relative to the rotational speed the aerodynamic forces tend to decrease pitch, each blade having auxiliary masses supported wholly thereby, spaced lengthwise of the blade from the axis of rotation of said propeller and so disposed with relation to the pivotal axis of the blade that the centrifugal moments thereof oppose the centrifugal moments acting on the blade's own mass and the combined centrifugal moments of the blade and auxiliary masses tend to maintain a predetermined pitch, said centrifugal moments and said aerodynamic forces of the respective blades cooperating to decrease pitch when rotational speed is high with relation to forward speed and to increase pitch when rotational speed is low with relation to forward speed.

2. In a propeller, a hub, a plurality of blades separately mounted on said hub for pivotal movement about radial axes substantially in the plane of rotation of said hub free from restraint other than the restraint inherent in the blades themselves, said blades being tiltable about the center of gravity of the propeller assembly, the area of each blade being so positioned with respect to its pivotal axis that when the forward speed of the craft which carries the propeller is increased relative to rotational speed of the propeller the aerodynamic forces on the blade turn it to increase pitch and when forward speed of the craft is decreased relative to the rotational speed the aerodynamic forces tend to decrease pitch, each blade having auxiliary masses supported wholly thereby, spaced lengthwise of the blade from the axis of rotation of said propeller and so disposed with relation to the pivotal axis of the blade that the centrifugal moments thereof oppose the centrifugal moments acting on the blade's own mass and the combined centrifugal moments of the blade and auxiliary masses tend to maintain a predetermined pitch, said centrifugal moments and said aerodynamic forces of the respective blades cooperating to decrease pitch when rotational speed is high with relation to forward speed and to increase pitch when rotational speed is low with relation to forward speed.

3. In a propeller, a hub, a plurality of blades pivotally mounted on said hub for free movement with relation one to the other about axes extending lengthwise of the respective blades, the area of each blade being so positioned with respect to its pivotal axis that when the forward speed of the craft which carries the propeller is increased relative to rotational speed of the propeller the aerodynamic forces on the blade turn it to increase pitch, said blade having auxiliary masses supported wholly thereby whose centrifugal moments partly balance the centrifugal moments acting on the blade's own mass, said aerodynamic forces and said centrifugal moments of the respective blades cooperating to hold said blades at desired pitches throughout the range of operation of the propeller and to produce substantially equal thrust in all blades.

4. In a propeller, a hub having a part tiltable about the center of gravity of the propeller assembly and a plurality of blades mounted on a tiltable part of said hub for rotation with relation one to the other about axes extending lengthwise of the respective blades, the area of each blade being so positioned with respect to its pivotal axis that when the forward speed of the craft which carries the propeller is increased relative to the rotational speed of the propeller the aerodynamic forces on the blade turn it to increase pitch, said blade having auxiliary masses supported wholly thereby whose centrifugal moments oppose the centrifugal moments acting on the blade's own mass, and said aerodynamic forces and said centrifugal moments of the respective blades cooperating to hold said blades at desired pitches throughout the range of operation of the propeller and to produce substantially equal thrust in all blades regardless of minor differences between the structures of the blades.

5. In a propeller, a hub, a plurality of blades pivotally mounted on said hub for free movement with relation one to the other about axes extending lengthwise thereof, the area of each blade being so positioned with respect to its pivotal axis that when the forward speed of the craft which carries the propeller is increased relative to rotational speed of the propeller the aerodynamic forces on the blade turn it to increase pitch, each blade having auxiliary masses supported wholly thereby whose centrifugal moments oppose the centrifugal moments acting on the blade's own mass, and said aerodynamic forces and said centrifugal moments cooperating to hold the blades at such pitches as the forward speed varies as to maintain substantially a constant torque load on the motor.

6. In a propeller, a hub, a plurality of blades pivotally mounted on said hub for free movement with relation one to the other about axes extending lengthwise thereof, the area of each blade being so positioned with respect to its pivotal axis that when the forward speed of the craft which carries the propeller is increased relative to rotational speed of the propeller the aerodynamic forces on the blade turn it to increase pitch, each blade having auxiliary masses supported wholly thereby whose centrifugal moments oppose the centrifugal moments acting on the blade's own mass, and said aerodynamic forces and said centrifugal moments cooperating to hold the blades at such pitches as the forward speed varies as to maintain substantially a constant torque load on the motor, and to bring the blades into feathering position when driving torque is discontinued.

7. In a propeller, a hub, a plurality of blades pivotally mounted on said hub for free movement with relation one to the other about axes extending lengthwise thereof, the area of each blade being so positioned with respect to its pivotal axis that when the forward speed of the craft which carries the propeller is increased relative to rotational speed of the propeller the aerodynamic forces on the blade turn it to increase pitch, each blade having auxiliary masses supported wholly thereby whose centrifugal moments oppose the centrifugal moments acting on the blade's own mass, and said aerodynamic forces and said centrifugal moments cooperating to substantially instantaneously rotate said blades to the desired pitch as the relation of forward speed to rotational speed changes.

8. In a propeller, a hub, a plurality of blades pivotally mounted on said hub for free movement with relation one to the other about axes extending lengthwise thereof, the area of each blade being so positioned with respect to its pivotal axis that when the forward speed of the craft which carries the propeller is increased relative to rotational speed of the propeller the aerodynamic forces on the blade turn it to increase pitch, each blade having auxiliary masses supported wholly thereby whose centrifugal moments oppose the centrifugal moments acting on the blade's own mass, and said aerodynamic forces and said centrifugal moments cooperating to hold the blades at desired pitches throughout a wide range of speeds of the craft and also a wide range of rotational speeds of the propeller, said auxiliary masses being so disposed with respect to the respective blades as to substantially prevent engine torque impulses from causing any rotation of the blade about its pivot axis.

9. In a propeller, a hub, a plurality of blades pivotally mounted on said hub for free movement with relation one to the other extending lengthwise thereof, the area of each blade being so positioned with respect to its pivotal axis that when the forward speed of the craft which carries the propeller is increased relative to rotational speed of the propeller the aerodynamic forces on the blade turn it to increase pitch, each blade having auxiliary masses supported wholly thereby whose centrifugal moments oppose the centrifugal moments acting on the blade's own mass, and said aerodynamic forces and said centrifugal moments cooperating to hold the blades at desired pitches throughout a wide range of speeds of the craft, and also a wide range of rotational speeds of the propeller, said auxiliary masses being adjustable with relation to the respective blades to modify their action on said blade.

10. In a propeller, a hub comprising a driving member, and a driven member, each having a plurality of elements spaced apart circumferentially of said hub and arranged in opposed relation to the corresponding elements of the other member, said driven member and its elements being arranged with relation to said driving member and its elements for tilting movement about the center of gravity of the propeller, resilient means interposed between each element of each member and the two adjacent elements of the other member to drivingly connect said members and to yieldably resist the tilting movement of said driven member, a plurality of blades pivotally mounted on said driven member for free movement with relation to each other about axes extending lengthwise of the respective blades and connected with said driven member for tilting movement therewith against the resistance of said resilient means, the area of each blade being so positioned with respect to its pivotal axis that when the forward speed of the craft which carries the propeller is increased relative to rotational speed of the propeller the aerodynamic forces on the blade turn it to increase pitch, said blade having auxiliary masses supported wholly thereby whose centrifugal moments oppose the centrifugal moments acting on the blade's own mass, said aerodynamic forces and said centrifugal moments cooperating to hold the blade at desired pitches.

11. In a propeller, a hub, a plurality of blades mounted on said hub for free pivotal movement about axes extending lengthwise thereof, the aerofoil portion of each blade being so positioned with respect to its pivotal axis that when the forward speed of the craft which carries the propeller is increased relative to rotational speed of the propeller the aerodynamic forces on the blade turn it to increase pitch and when the forward speed of the craft is decreased relative to rotational speed the aerodynamic forces tend to decrease pitch, each blade having auxiliary masses supported wholly thereby and so disposed with relation to the pivotal axis of the blade and the plane of rotation that the centrifugal moments thereof oppose centrifugal moments acting on the blade's own mass and the combined centrifugal moments of the blade and auxiliary masses tend to maintain a predetermined pitch, said aerodynamic forces acting to decrease said predetermined pitch when rotational speed is high with relation to forward speed and to increase pitch when rotational speed is low with relation to forward speed.

12. In a propeller, a hub, a plurality of blade structures projecting outwardly from and mounted for pivotal movement with respect to said hub, each of said blade structures including an aerofoil portion having mass productive of centrifugal moments tending to turn the blade structure about its pivotal axis toward a position of zero pitch and each of said blade structures also including another portion embodying a compensating mass portion individual thereto in its action on the blade and having a fixed operating position relative to the remainder of said blade structure and located with respect to said pivotal axis and the plane of rotation to produce centrifugal moments opposing the centrifugal moments produced by the mass of said aerofoil portion, the opposed centrifugal moments acting to maintain a predetermined blade pitch when the ratio of forward to rotational speed of the propeller has a predetermined value and the surface area of said aerofoil portion being so distributed with respect to said pivotal axis that upon a change of said ratio to a value greater than said predetermined value the aerodynamic forces acting on said area tend to increase said predetermined pitch and upon a change of said ratio to a value less than said predetermined value said aerodynamic forces tend to decrease said predetermined pitch.

KENNETH G. FRASER.